United States Patent [19]

Lines

[11] 3,962,771
[45] June 15, 1976

[54] STONE AND ROD HOLDER DEVICE

[76] Inventor: Roy Lines, Box 383, Oriska, N. Dak. 58063

[22] Filed: July 3, 1975

[21] Appl. No.: 592,919

[52] U.S. Cl. ............................................... 29/283
[51] Int. Cl.² ....................... B23Q 1/00; B23Q 3/00
[58] Field of Search ........................ 29/283; 248/44

[56] References Cited
UNITED STATES PATENTS

| 650,001 | 5/1900 | Becker et al. | 248/44 |
| 1,255,557 | 2/1918 | Norman | 248/44 |
| 2,455,404 | 12/1948 | Brown et al. | 248/44 |
| 2,502,040 | 3/1950 | Franklin | 248/44 |

Primary Examiner—James L. Jones, Jr.
Attorney, Agent, or Firm—Robert E. Kleve

[57] ABSTRACT

The invention comprises a holding device for aligning a stone in relation to a rod for attachment of the rod to the stone. The holder device has a platform with clamping means to secure a stone thereon with the center of the stone centrally on the platform. The platform also has a support member which extends over the center of a platform with a channel member fixed to the support member above the center of the platform and extending down towards the center of the platform in perpendicular relation, whereby the rod may be secured in the channel with their lower ends of the rod abutting the stone at approximately the center of the stone and the rod may be glued to the stone. The rod may be held in the channel in its abutting perpendicular central position by being tied to the channel member until the glue has hardened, whereupon the rod and stone may be removed from the holder, with the rod attached centrally to the stone and the rod may be used to rotate the stone for grinding and shaping the stone.

1 Claim, 5 Drawing Figures

U.S. Patent June 15, 1976 3,962,771
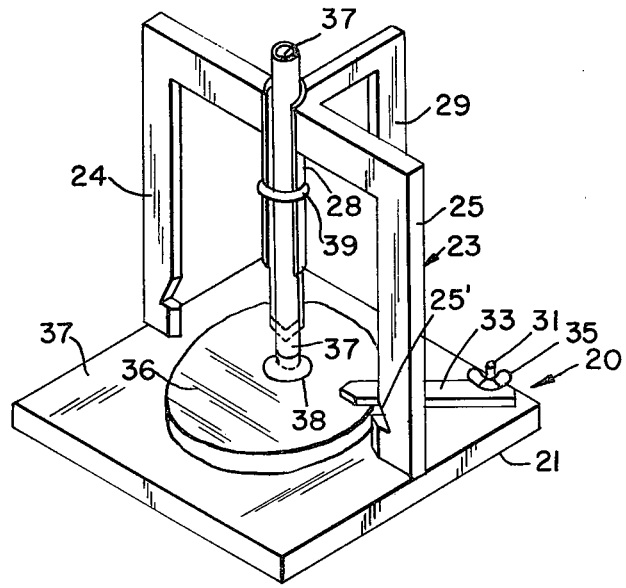
FIG.1.
FIG.2.
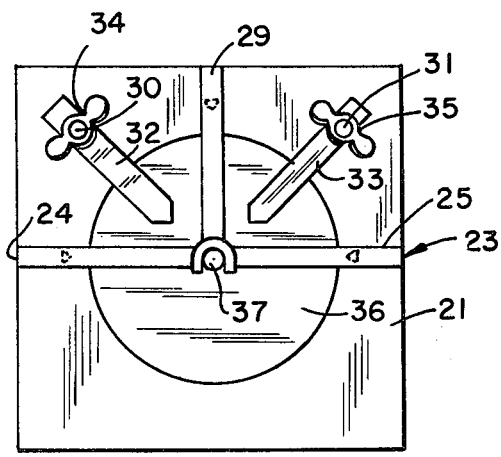
FIG.3.
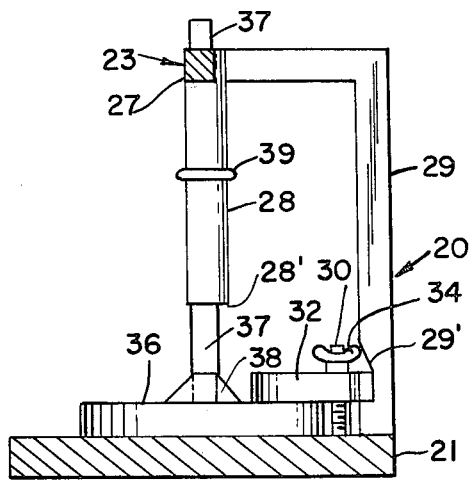
FIG.4.
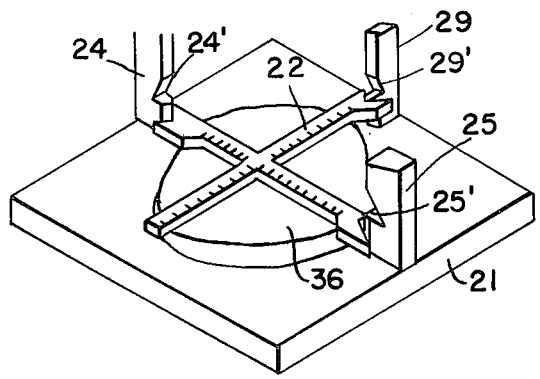
FIG.5.
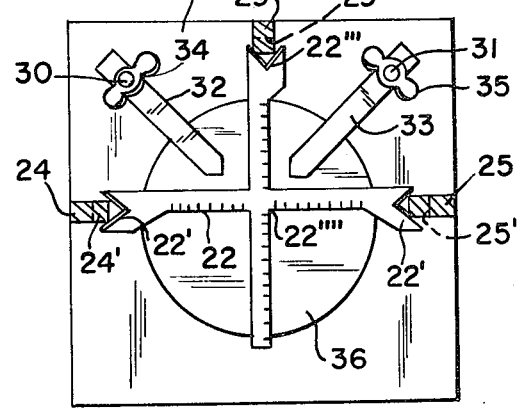

STONE AND ROD HOLDER DEVICE

This invention relates to holders, more particularly, the invention relates to a holder or jig for holding and aligning a stone and rod for attachment of the rod to the stone.

It is an object of the invention to provide a novel holder for rapidly aligning and holding a stone for aligning and holding a rod perpendicular and centrally on the rod while glueing the rod to the stone, so that the rod can later be used to support and rotate the stone while grinding and shaping the stone.

It is another object of the invention to provide a holder or jig for holding and aligning a stone and rod with the end of the rod perpendicular to the stone in its desired position on the stone while glueing the rod to the stone, so that the rod can later be used to support the stone while grinding and shaping the stone.

Further objects and advantages of the invention will become apparent as the description proceeds and when taken in conjunction with the accompanying drawing wherein:

FIG. 1 is a perspective view of the stone and rod holder device.

FIG. 2 is a top plan view of the stone and rod holder device.

FIG. 3 is a cross-sectional view taken along line 3—3 of FIG. 2.

FIG. 4 is a fragmentary perspective view of the holder with a marking stick attached to center the stone on the holder.

FIG. 5 is a frgmentary top view of the holder with the marking stick attached to center the stone on the holder.

Briefly stated, the invention comprises a rectangular platform with markings on the platform extending out from the center of the platform for aligning a stone thereon with the center portion of the stone centrally aligned on the platform, clamp means to secure the stone aligned on the platform, an inverted U-shaped bridge having its legs mounted to the side edges of the platform, and the apex of the bridge extending across the center of the platform, an elongated channel member fixed vertically in length to the apex of the bridge and extending vertically downward toward the center of the platform, with its lower edge terminating at a location spaced above the platform, means to secure a rod in said channel member whereby a stone may be aligned centrally on the platform with at least the approximate center of the stone directly below and beneath the lower end of the channel member and held in this position by the clamping means and whereby a rod may be positioned extending vertically in the channel member with its lower end abutting at least approximately center of the stone and glued to the stone. The rod is secured in the channel member in this position until the glue has hardened. Whereupon the rod and stone may be removed with the rod attached centrally and perpendicularly to the stone and the rod may be used to rotate the stone for grinding and shaping the stone.

This application is related to my pending patent application, Ser. No. 565,418, filed Apr. 7, 1975, which concerns an apparatus for grinding and shaping a stone and which apparatus receives a rod attached or glued to the stone and rotates the rod to rotate the stone while it places the edge of the stone against a grinding wheel to grind a stone in a selected shape or size.

Referring more particularly to the drawing in FIG. 1, the stone and rod holder device 20 is illustrated as having a rectangular base platform 21. An inverted U-shaped bridge member 23 has its legs 24 and 25 affixed to platform which extend vertically upward with the apex 27 extending across the center of the platform 21. A channel member 28 is fixed to the apex of the bridge member and projects vertically downward toward the center of the top face of the platform in perpendicular relation. The channel member 28 has its lower end 28' terminating at a location spaced above the top face of the platform. An L-shaped brace member 29 has one end 29' fixed to platform 21 and its other end 29'' fixed to the apex 27 of the bridge member to brace the bridge member.

The platform 21 has two threaded rods 30 and 31 at opposite corners of the platform with the lower ends of the rods fixed in the platform 21 and projecting vertically upward. A pair of elongated plates 32 and 33 have bores in their rearward ends to receive the rods 30 and 31, and a pair of threaded nuts 34 and 35 threaded onto the tops of rods 30 and 31 against the plates.

The stone holder device 20 is used or operated as follows:

A stone 36 which is later to be shaped by grinding will be placed upon the face 37 of the platform. A marking stick 22 having notches 22', 22'', and 22''', will be attached over the stone 36 by inserting the notches 22', 22'', and 22''' into the notches 24' and 25' and 29' of the braces 24, 25, and 29, and thereafter sliding the stick 22 down upon the stone as illustrated in FIGS. 4 and 5. The marking stick 22 has an X-shape with markings indicia along its surface and is constructed off center so that the corner 22'''' of the stick, when the stick is attached, is at the center of the holder. The stone will be slid beneath the stick 22, on the holder, until the stone is positioned as close as possible to the center of the stone holder.

The pair of elongated plates 32 and 33 will be attached to the platform by inserting the bores of the plates onto rods 30 and 31 and placing the front ends of the plates 32 and 33 on top of the stone 36. The nuts 34 and 35 will be threaded onto the rods and threaded downward against the plate 32 and 33 and tightened to cause the undersurfaces of the front ends of the plate 32 and 33 to engage against the stone and lock the stone to the platform in its aligned position with the approximate center of the stone as close as possible to the approximate center of the platform.

Thereafter, the operator will take a rod or stick 37 of the type commonly used and of the type commonly attached to stone to hold the stone while grinding, and apply glue or wax 38 to the lower end 37' of the stick or rod 37 and will insert the rod 37 in the channel member 28 and slide the rod 37 down the channel member 28 until the rod abuts the top face of the stone in perpendicular relation, and then applies additional glue 38 about the lower end of the rod 37, as illustrated in FIGS. 1, 2, and 3. The operator may tie the rod 37 to the channel member by rubber bands or string 39 at several locations to hold the rod 37 in the channel member perpendicular to the stone. Although normally this is not necessary, as the wax hardens very rapidly and will hold the stick to the stone perpendicularly almost immediately after the stick is engaged against the stone.

Consequently the operator normally simply manually holds the stick 37 in the channel 28 with the bottom of the stock against the stone and with the wax connecting the stick to the stone until the wax hardens. After the wax has hardened the nuts 30 and 31 and plates 32 and 33 can be removed and the stone 36 and rod 37 can be removed from the stone holder device, with the wax holding the rod to the stone in perpendicular relation in the approximate center of the stone.

The glue or wax 38 is actually an adhering wax of a type commonly used by persons in the trade who grind and shape stones to glue stones to a stick. The glue or wax has sufficient strength when hardened to glue or hold the rod perpendicular and centrally on the stone in fixed relation to the stone while the rod is inserted into a chuck of a rotating support apparatus of the type described in my co-pending patent application already referred to. The rod is rotated by the chuck with the edge of the stone against a grinding wheel to grind the stone into selected shapes for use as a neck pendant and the like.

After the stone has been shaped by a stone grinding apparatus, the stone will be removed from the rod by suitable conventional means.

Thus it will be seen that a novel holder has been provided by which an operator can rapidly position a stone for grinding and positioning rapidly and accurately align a rod for glueing onto the stone in a perpendicularly central point on the stone and which holder will hold the stone and rod in the aligned position until the wax applied between the rod and the stone has had time to harden to fix them in their relative positions.

It will be obvious that various changes and departures may be made to the invention without departing from the spirit thereof and accordingly, it is not intended that the invention be limited to that specifically described in the specification or as illustrated in the drawing but only as set forth in the appended claims wherein:

What is claimed is:

1. A holder device for holding and aligning a stone and rod for attachment together comprising a platform with marking means on the platform extending out from the center of the platform for aligning a stone thereon, with the center of the stone centrally on the platform, clamp means to secure a stone aligned on the platform, a support member extending upward from the side of the platform over the center of the platform, an elongated channel member fixed to the support member at the center of the platform and extending vertically downward toward the center of the platform with its lower edge terminating at a location above the platform, said elongated channel member receiving said rod therein, whereby a stone may be aligned with at least the approximate center of the stone centrally on the platform and the rod may be glued to the stone while positioned in the channel member until the glue is hardened, whereupon the rod and stone may be removed with the rod attached centrally and perpendicularly to the stone and the rod may be used to rotate the stone for grinding and shaping the stone.

\* \* \* \* \*